United States Patent
Fuehrer et al.

(10) Patent No.: US 7,260,652 B2
(45) Date of Patent: Aug. 21, 2007

(54) METHOD AND COMMUNICATION SYSTEM FOR EXCHANGING DATA BETWEEN AT LEAST TWO STATIONS VIA A BUS SYSTEM

(75) Inventors: Thomas Fuehrer, Gerlingen (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 10/034,056

(22) Filed: Dec. 27, 2001

(65) Prior Publication Data

US 2002/0103939 A1 Aug. 1, 2002

(30) Foreign Application Priority Data

Dec. 28, 2000 (DE) ................. 100 65 117

(51) Int. Cl.
- G06F 15/16 (2006.01)
- G06F 1/04 (2006.01)
- G06F 1/12 (2006.01)
- H04L 7/00 (2006.01)

(52) U.S. Cl. .................. 709/248; 709/203; 713/375; 713/400; 375/356

(58) Field of Classification Search ............. 375/356; 714/10; 709/248, 203; 713/375, 400
See application file for complete search history.

(56) References Cited

U.S. PATENT DOCUMENTS

| | | | |
|---|---|---|---|
| 4,980,857 A * | 12/1990 | Walter et al. ............ 714/45 |
| 5,402,394 A * | 3/1995 | Turski ..................... 368/10 |
| 5,408,506 A * | 4/1995 | Mincher et al. ......... 375/134 |
| 5,802,354 A * | 9/1998 | Kubala et al. .......... 713/400 |
| 6,351,821 B1 * | 2/2002 | Voth ...................... 709/248 |
| 6,535,926 B1 * | 3/2003 | Esker .................... 709/248 |
| 6,714,611 B1 * | 3/2004 | Du et al. ................ 713/400 |
| 6,865,686 B1 * | 3/2005 | Krause et al. .......... 713/400 |
| 2002/0129291 A1 * | 9/2002 | Gonzalez ............... 713/400 |

OTHER PUBLICATIONS

"Communications Protocols for Class C Applications" SAE J2056/1 Jun. 1993.

* cited by examiner

*Primary Examiner*—Nathan J. Flynn
*Assistant Examiner*—Joshua Joo
(74) *Attorney, Agent, or Firm*—Kenyon & Kenyon LLP

(57) ABSTRACT

A method and communication system for exchanging data between at least two stations that are connected to one another via a distributed bus system, in which the data is contained in messages that are sent by the stations via the bus system. A common global time base, which at a predefinable instant is synchronized with an external reference time, and is provided for the stations of the bus system. To ensure reliable synchronization of the global time base with the external reference time, in particular without destroying the characteristics of the global time, (that is, without causing jumps in the global time base or a regressive global time), the stations of the communication system receive information regarding correction of the global time base, consent to a uniform correction value, and synchronously carry out external synchronization (that is, correction of the global time base).

34 Claims, 2 Drawing Sheets

METHOD AND COMMUNICATION SYSTEM FOR EXCHANGING DATA BETWEEN AT LEAST TWO STATIONS VIA A BUS SYSTEM

FIELD OF THE INVENTION

The present invention relates to a method and a communication system for exchanging data between at least two stations that are connected to one another via a distributed bus system. The data is contained in messages that are sent by the stations via the bus system. A common global time base, which at a predefinable instant is synchronized with an external reference time, is provided for the bus system's stations. The present invention also relates to a distributed bus system for exchanging data between at least two stations of a communication system. The present invention also relates to a memory element for a communication system station that is connected to at least one other station via a distributed bus system for exchanging data. The memory element may be a read-only memory, a random-access memory, or a flash memory. The present invention also relates to a computer program that may be run on an arithmetic unit of a communication system station (in particular, on a microprocessor), and that may be stored in the memory element.

BACKGROUND INFORMATION

It is believed that the use of communication systems in motor vehicles may be becoming increasingly widespread. The Society of Automotive Engineers (SAE) has defined three requirement classes relating to communications in motor vehicles. These classes may differ based on the priority of the messages to be exchanged, the varying real-time requirements, and the applications involved. Class C may be regarded as having demanding requirements. The SAE has published the following specifications regarding Class C: "Communication Protocols for Class C Applications", SAE J2056/1, Jun. 1993. Class C may have particular significance in regards to future vehicle functions such as x-by-wire systems including, for example, steer-by-wire and brake-by-wire. These functions may be demanding in terms of real-time capability and reliable communication protocols.

Controller area network (CAN) bus systems (if necessary with upgrades for x-by-wire systems, and time triggered protocols for Class C (TTP/C)) may be used in these safety-critical vehicle functions. One of the key features of these protocols may be the global time base present for all stations of the bus system.

The global time base is a time base that may be valid throughout the communication system. It may play an important role in time control in communications (such as, for example, time control communication protocols, e.g., TTP/C) and in the application in question (such as time-controlled operating systems, e.g., Robert Bosch GmbH's XERCOS). It may also play an important role in diagnostic functions, error detection, and error management. If a global time base is used, this common time base may be present for all stations of the overall communication system, independently of what is responsible for generating the global time base. The local time base of a given station may be synchronized with the local time base of the bus system's other stations. This synchronization may be carried out based on the global time base.

The global time base constitutes an abstract notation, and the local clocks in the stations may only approximate to it. Thus, the stations have a local view of the global time base. The individual stations may only be connected to one another via the communication system. Because responsibility for the global time base may therefore only be assigned to the overall system, the communication system may bear this responsibility, for reasons of complexity.

The global time base may be generated according to two different models. In the first model, the global time base may be generated by a central master station of the bus system. This master may have a functionality that may be suitable for providing a global time base. The master may periodically send its view of the global time base to the other stations of the overall system. The other stations may take over the master's view of the global time base and make it their own global time base. In a communication system of this kind having a master station, synchronizing the global time base with an external reference time may not present any difficulties, provided the master station has access to the external reference time.

The situation may be different in the case of the second model for generating the global time base. The local views of the global time base may be exchanged among the bus system's stations via an algorithm that functions distributively in the communication system, e.g., a fault-tolerant average algorithm, and a difference may be calculated based on the values received. During a predefinable interval—the re-synchronization interval—the difference between the user's own view and the global time base may be corrected so that the view of a given station may be synchronized with the global time. In distributed bus systems of this kind, it may not be a straightforward matter to synchronize the global time base with an external reference time. Due to synchronization, an erroneous global time base may arise, i.e., the global time base may have substantial jumps or may be regressive.

SUMMARY OF THE INVENTION

In a communication system having a distributed bus system, it is believed that the exemplary embodiment and/or exemplary method of the present invention may at least better ensure that the global time base is synchronized with an external reference time in a reliable manner, for example without destroying the characteristics of the global time base, i.e., without causing jumps in the global time and without causing a regressive global time.

To synchronize the global time base with the external reference time utilizing the above exemplary method for exchanging data, the exemplary embodiment and/or exemplary method of the present invention involves the following:

- a time signal of the external reference time that is received by at least one of the stations;
- in the at least one station a correction target value between the time signal that is received and the global time base is determined;
- the correction target value is sent to the bus system's other stations;
- a correction value is determined in the bus system's stations as a function of the correction target value; and
- in the bus system's stations, at the predefinable instant, the global time base is synchronized with the external reference time as a function of the correction value that has been determined and the global time base.

The exemplary embodiment and/or exemplary method of the present invention involves a communication system and a communication protocol, and includes the transfer of messages and a global time base, and if necessary, with internal clock synchronization. Additionally, a mechanism to at least better ensure reliable synchronization of the global time base with an external reference time (external synchronization) is provided. The external reference time is, for example, a Global Positioning System (G.P.S.) time or a D.F. time (German Long Wave Transmitter, Frankfurt).

A request for synchronization of the global time base with the external reference time is sent by an application running on an arithmetic unit (in particular, on a microprocessor) of a station of the bus system. The request may then be forwarded from the arithmetic unit to the communication controller via an interface. Upon receipt of the request, the communication controller may trigger synchronization of the global time base with the external reference time in the entire communication system. The communication system stations, communication controllers' individual views of the global time base is brought in line with the external reference time in a reliable manner. "Reliable" refers to the global time base or the characteristics of the global time base that may be needed for the communication system may not be destroyed by any external influences, including erroneous ones.

Synchronization of the global time is carried out via one or a plurality of communication controllers. The controllers of all the communication system stations receive information regarding the necessary correction of the local views of the global time base, consent to a uniform correction value, and synchronously convert the external synchronization, (that is, correct the global time base).

In today's motor vehicles, error management and entering of errors that arise and error patterns in an operating data memory along with time information (a time stamp) may already play a significant role. Operating data in the operating data memory may be evaluated efficiently and precisely if the stored data is referenced to an external reference time. To accomplish this, the global time base is synchronized with the external reference time. If the global time base of a plurality of vehicles is synchronized with a common reference time, for example, the origin of a complex road accident may be reconstructed in a relatively simple manner by evaluating the operating data memory.

The exemplary method of the present invention is believed to allow reliable synchronization to be carried out. This means that no jumps in the global time base arise as a result of the synchronization, the global time base does not take a regressive step due to the external synchronization, and individual station clocks do not diverge. This method may be used to prevent a situation in which synchronization of the stations with each other is jeopardized by the influence of an external reference time that may be erroneous.

The implementation of the reliable external synchronization may, for example, be embodied in a motor vehicle control device which may be connected to a distributed bus system via its communication controller and which may have access to the external reference time via special software and a special interface.

The exemplary method according to the present invention is based on a communication system network having a plurality of function-performing stations that is connected to one another via a distributed bus system. Each station may include an arithmetic unit or process control computer (in particular, a microprocessor), and a communication controller. Initially, the request for synchronization of the global time base with the external reference time may not be present at any of the stations.

According to another exemplary method and/or exemplary embodiment the global time base is synchronized with the external reference time be triggered by comparison of the global time base with the external reference time. This comparison may, for example, constitute calculation of the difference between the global time base and the external reference time.

Following the request for external synchronization, a time signal of the external reference time is received by at least one of the bus system's stations. Then, in the at least one station, a correction target value between the time signal that has been received and the global time base is determined. The correction target value is determined in the station's arithmetic unit, e.g. the microprocessor. Then the correction target value is sent by the at least one station to the bus system's other stations. To accomplish this, the correction target value is forwarded by the station's arithmetic unit to the communication controller via an interface. This step is carried out or performed in the arithmetic unit of each bus system station that has access to an external reference time. However, this step may not necessarily have to be carried out synchronously in all the stations. Instead, a time window may be predefined in which a plurality of stations simultaneously or consecutively determine a correction target value and send it to the bus system's other stations.

According to another exemplary method and/or exemplary embodiment of the present invention, the correction target value may be sent to the bus system's other stations periodically. The correction target value may also be sent to the other stations of the bus system if a correction target value other than zero is present. The correction target value may also be sent to the other stations of the bus system if a request is sent by one of the other stations of the bus system. According to this last exemplary method and/or exemplary embodiment, for example, a station that does not have its own access to the external reference time may request that a correction value of the at least one station be sent. The correction target value may be sent by the at least one station to other stations of the bus system via the bus system. To accomplish this, according to another exemplary method and/or exemplary embodiment, the correction target value may be contained in a separate message and this separate message may be sent to the other stations of the bus system.

According to another exemplary method and/or exemplary embodiment of the present invention, the correction target value may be contained in a test message of the bus system which may be sent to the other stations of the bus system. An example of a test message may be an initialization frame (I-frame) in the TTP/C protocol. An I-frame may make the most important information available for a communication controller. This information may not have been integrated into the communication system until a later instant. The I-frames may be sent periodically by different communication controllers.

According to another exemplary method and/or exemplary embodiment of the present invention, the correction target value may be contained in the test data present in a data message of the bus system that may be sent to the other stations of the bus system.

All communication controllers of the bus system stations that have access to the external reference time may be required to send a corresponding message containing the correction target value to the other stations within a time window of predefinable length. This may ensure that synchronization of the global time with the external reference time may be carried out or performed via more than one arithmetic unit (process control computer) having access to the external reference time.

In this way, every communication controller in the communication system network (i.e., this includes the communication controllers that do not have access to the external reference time) may receive a vector having the time correction target values of the stations that do have access to the external reference time in the form of vector components.

Next, in each bus system station an actual correction value is determined as a function of the vector having the various correction target values. The correction value is determined in the bus system stations with the help of error correction, which may include Byzantine error correction, as a function of the correction target value. To accomplish this, all communication controllers in the communication system network (i.e., this includes the controllers that do not have access to the external reference time) may send a function of their view of the vector having the correction target values via the bus system. The function of a controller's view of the vector may, for example, be the entire vector, or an average of the individual correction target values of the vector, or a fault-tolerant average of the correction target values of the vector.

To obtain a fault-tolerant average, for example, the individual correction target values of the vector may be sorted, the smallest and the greatest values may be deleted, and the fault-tolerant average may be generated from the remaining values. In the ideal case, the communication controllers all have the same view of the vector.

Each controller may calculate the correction value via a fault-tolerant algorithm using the information available in each communication controller. Ideally, this correction value is equal for all the controllers, not only in error-free cases but also in error-ridden cases in which the errors may be corrected using the fault-tolerant algorithm. Determining the correction value via Byzantine error correction may have the advantage that the error correction and error detection characteristics may be good. If necessary, if there are non-correctable errors, synchronization of the global time base with the external reference time may be rejected, i.e., for example the correction value may be set to zero.

The correction value in the bus system's stations may be determined without error correction, as a function of the correction target value. Herein, each communication controller may calculate the correction value directly from the vector having the correction target values, via an algorithm.

As soon as a correction value is present in each of the communication controllers, the global time base may be synchronized with the external reference time. Synchronization may be initiated simultaneously in all the communication controllers and ended within a predefinable time interval. In order to avoid large jumps in the global time base due to the synchronization, in the case of relatively large differences between the global time base and the external reference time, the global time base may be brought in line with the external reference time slowly, that is, for example, with jumps of +1. Thus, it may take some time for the global time base to reach the value of the external reference time. The global time base may not reach the external reference time within the predefinable time interval. Another requirement regarding synchronization may be that the global time base grow monotonously. It may be important to prevent a decreasing time base—which may correspond to a clock running regressively—or a time base that remains the same.

The global time base may also be synchronized with the external reference time by adding the correction value to the global time base. Alternatively, the global time base may be synchronized with the external reference time by multiplying the correction value by the global time base. If, for example, after a plurality of synchronization procedures it is determined that the global time base always deviates from the external reference time by the same amount, the correction value may be provided as a factor that would offset this difference. The correction value might also include a combination of a factor and a summand, the factor being multiplied by the global time base and the summand being added to the global time base as an offset.

The predefinable instant for synchronizing the global time base with the external reference time may be explicitly predefined. Alternatively, the global time base may be synchronized with the external reference time triggering the transmission of the correction value to a synchronization algorithm, this transmission being carried out at an explicitly predefined instant.

In order to synchronize the global time base with the external reference time utilizing the communication system of the type referred to above, the another exemplary method and/or exemplary embodiment of the present invention alternatively involves the following:

at least one station receiving a time signal of the external reference time;

the at least one station determining a correction target value between the time signal received and the global time base;

the at least one station sending the correction target value to the other stations of the bus system;

the bus system's stations determining a correction value as a function of the correction target value; and at the predefinable instant the bus system's stations synchronizing the global time base with the external reference time as a function of the correction value that has been determined and the global time base.

The communication system may also include an apparatus, arrangement or structure for carrying out the exemplary method according to the present invention.

Also, based on the distributed bus system of the type referred to above, the exemplary method according to the present invention may be carried out using that bus system.

The exemplary method and/or exemplary embodiment according to the present invention may be implemented in the form of a memory element for a station of a communication system that may be connected to at least one other station via a distributed bus system for exchanging data. Herein, a computer program may be run on an arithmetic unit of the station (which may be on a microprocessor), and may be stored in the memory element. Thus, in this case the exemplary method and/or exemplary embodiment may be implemented via a computer program stored in the memory element, so that this memory element having the computer program may represent the exemplary method and/or exemplary embodiment in the same way as the exemplary method which the computer program may be suitable for carrying out. For example, an electrical storage medium may be used as the memory element, e.g., a read-only memory, random access memory, or flash memory.

The exemplary method and/or exemplary embodiment also relates to a computer program which may be suitable for carrying out the exemplary method if it runs on an arithmetic unit (in particular, on a microprocessor) of a station of a communication system which may be connected to at least one other station via a distributed bus system for exchanging data. Herein, the computer program may be stored in a memory element, e.g. a flash memory.

DETAILED DESCRIPTION

Figure 1:
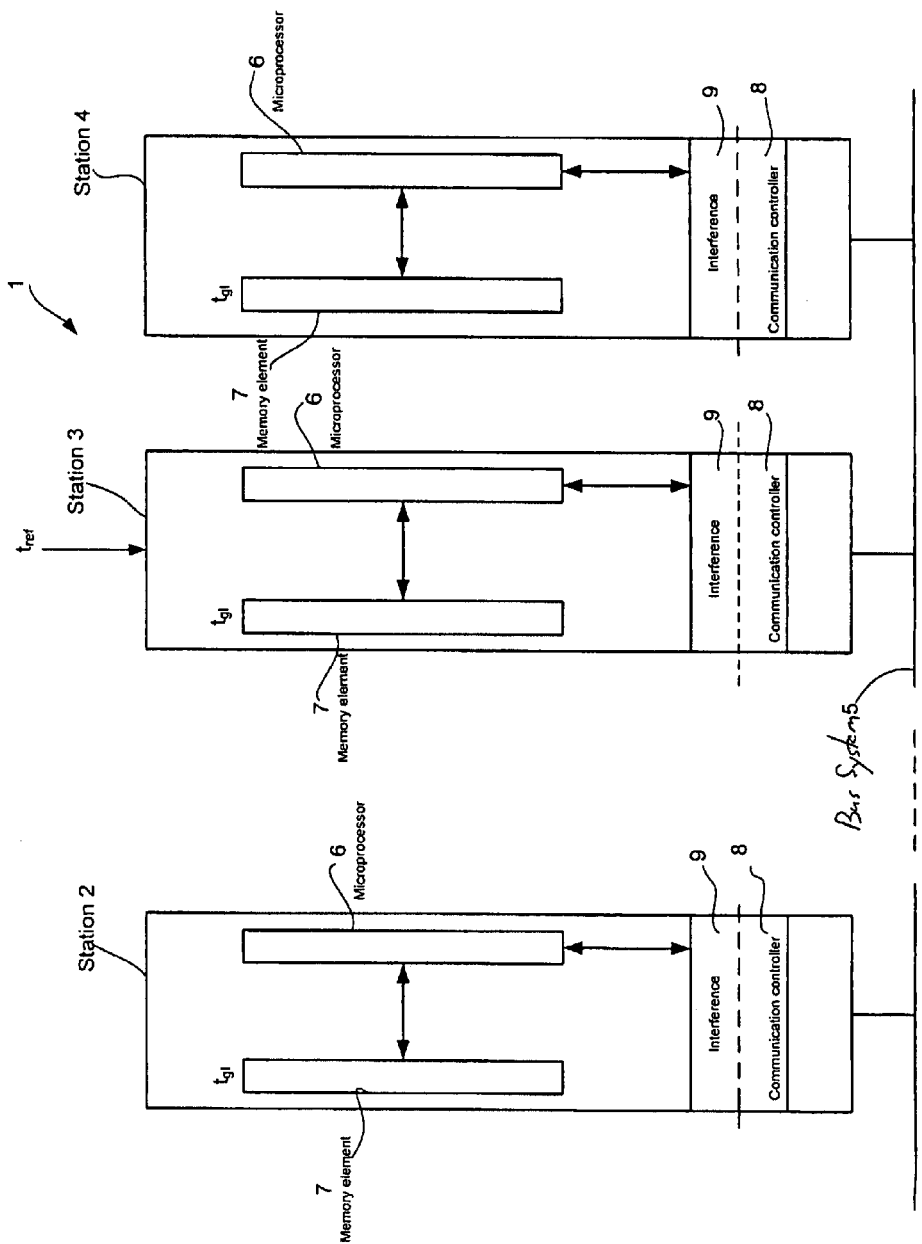
FIG. 1 shows an exemplary communication system according to the present invention.

FIG. 1 shows a communication system indicated in its entirety as reference number 1. Communication system 1 may include a plurality of stations 2, 3, 4, which are connected to one another via distributed bus system 5 to allow exchanging data. Stations 2, 3, 4 may be, for example, controllers of a motor vehicle. The data to be exchanged are contained in messages which are sent by stations 2, 3, 4 via bus system 5. Common global time base t_gl is present for stations 2, 3, 4 of bus system 5 and is synchronized with external reference time t ref at a predefinable instant t_synch.

Stations 2, 3, 4 may include an arithmetic unit (a process control computer), which may be embodied as microprocessor 6. A computer program which may be stored in memory element 7, which may be embodied as a flash memory, may be run on microprocessor 6, and is suitable for carrying out the method according to the present invention. The computer program may be loaded into microprocessor 6 before or during execution. Stations 2, 3, 4 may also include a communication controller 8, which may be connected to microprocessor 6 via interface 9. Communication controller 8 may create a connection between stations 2, 3, 4 and bus system 5. All stations 2, 3, 4 of communication system 1 may have access to bus system 5, but only station 3 might have access to external reference time t_ref.

Figure 2:
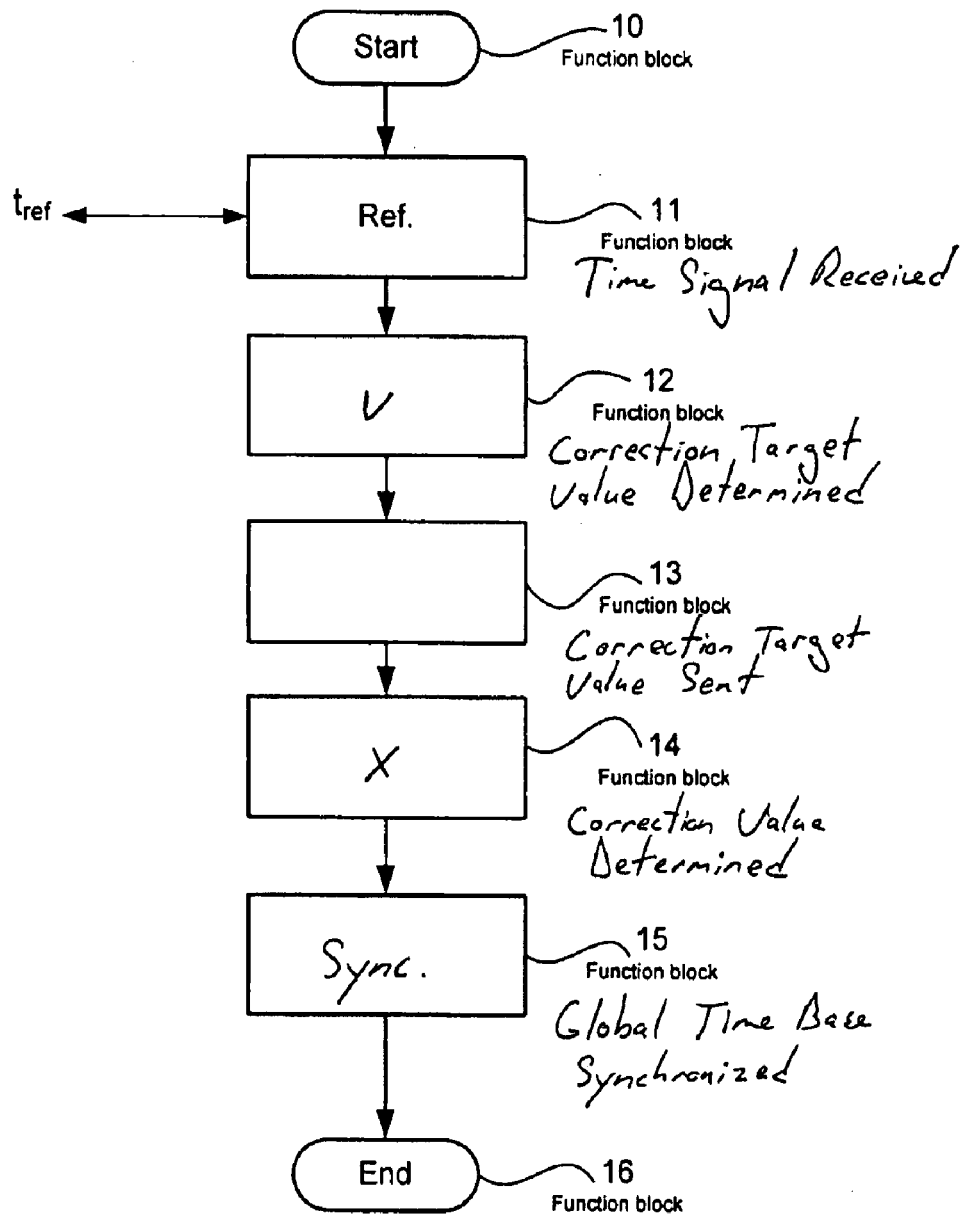
FIG. 2 shows a flow chart for an exemplary method according to the present invention.

To implement the reliable synchronization of global time base t_gl with external reference time t_ref, a reliable synchronization protocol has the steps described below. The exemplary method according to the present invention is explained below with reference to FIG. 2.

The exemplary method begins in function block 10. As soon as a request for external synchronization is present, in function block 11 a time signal of the external reference time t_ref may be received by station 3, which might have access to external reference time t_ref. If a plurality of stations of communication system 1 have access to external reference time t_ref, it may of course be feasible for each of these stations to receive a time signal and carry out the subsequent steps. Herein, the stations that have access to external reference time t_ref may not necessarily have to function synchronously. It would be perfectly feasible for them to be consecutively requested to carry out external synchronization, and thus the subsequent steps for the individual stations may run consecutively.

Based on the time signal of the external reference time t_ref that is received and global time base t_gl, in function block 12 a correction target value may be determined in station 3 via comparison of global time base t_gl with external reference time t ref. Then, in function block 13, the correction target value may be sent to the other stations 2, 3, 4 of communication system 1 via bus system 5. If a plurality of stations have access to external reference time t_ref, the correction target values of the various stations having access to reference time t_ref may be stored in every station of bus system 5 having and not having access to external reference time t_ref, as vector components of a vector v. Thus, for example, vector v having the time correction target value of station 3 that might have access to external reference time t_ref may be available to every station 2, 3, 4, i.e., also to stations 2 and 4 that may not have access to reference time t_ref.

Then, in function block 14, each station 2, 3, 4 of communication system 1 may determine a correction value x as a function of the correction target value of station 3. Next, in function block 15, at a predefined instant in stations 2, 3, 4, global time base t_gl may be synchronized with external reference time t_ref as a function of the determined correction value x and global time base t_gl. The method is ended in function block 16.

Communication controllers 8 of all stations 2, 3, 4 of communication system 1 may receive information regarding correction of global time base t_gl, consent to the uniform correction value x, and synchronously carry out external synchronization, i.e., correct the global time base t_gl.

What is claimed is:

1. A method for exchanging data between at least two stations connected to one another via a distributed bus system, the data being contained in messages sent by the at least two stations via the distributed bus system, the method comprising:
synchronizing a common global time base with an external reference time at a predefinable instant in the at least two stations of the distributed bus system as a function of corresponding correction values and the common global time base, wherein the synchronizing includes:
at least one of the at least two stations: receiving from a source external to the bus system a time signal of the external reference time; based on a content of the time signal, determining a correction target value between the received time signal and the common global time base; and sending the correction target value to other ones of the at least two stations of the distributed bus system; and
the at least two stations of the distributed bus system determining the corresponding correction values as a function of the correction target value; and
providing the common global time base that is synchronized with the external reference time at the predefinable instant for the at least two stations of the distributed bus system.

2. The method of claim 1, wherein a synchronization of the common global time base with the external reference time is triggerable by comparing the common global time base with the external reference time.

3. The method of claim 1, wherein the correction target value is sent to the other ones of the at least two stations periodically.

4. The method of claim 1, wherein the correction target value is sent to the other ones of the at least two stations if the correction target value is other than zero.

5. The method of claim 1, wherein the correction target value is sent to the other ones of the at least two stations upon a request by one of the other ones of the at least two stations.

6. The method of claim 1, wherein the correction target value is contained in a separate message sent to the other ones of the at least two stations of the distributed bus system.

7. The method of claim 1, wherein the correction target value is contained in a test message of the distributed bus system that is sent to the other ones of the at least two stations.

8. The method of claim 1, wherein the correction target value is contained in test data present in a data message of the distributed bus system that is sent to other ones of the at least two stations.

9. The method of claim 1, wherein the corresponding correction values are determined, in the at least two stations of the distributed bus system, using error correction as a function of the correction target value.

10. The method of claim 9, wherein the corresponding correction values are determined, in the at least two stations of the distributed bus system, using Byzantine error correction as a function of the correction target value.

11. The method of claim 1, wherein the common global time base is synchronized with the external reference time by adding a correction value to the common global time base.

12. The method of claim 1, wherein the common global time base is synchronized with the external reference time by multiplying a correction value by the common global time base.

13. The method of claim 1, wherein the predefinable instant for synchronizing the common global time base with the external reference time is explicitly predefined.

14. The method of claim 13, wherein synchronization of the common global time base with the external reference time is triggered by transmitting the corresponding correction values to a synchronization algorithm at an explicitly predefined instant.

15. A communication system having at least two stations and a distributed bus system via which the at least two stations are interconnected so that data can be exchanged between the at least two stations, the data being contained in messages that are sendable by the at least two stations via the distributed bus system, the communication system comprising:
a first arrangement to synchronize a common global time base with an external reference time at a predefinable instant in the at least two stations of the distributed bus system as a function of corresponding correction values and the common global time base, wherein the first arrangement to synchronize includes:
a receiving arrangement to receive from a source external to the bus system a time signal of the external reference time at at least one of the at least two stations,
a correction target value determining arrangement to determine based on a content of the time signal, in the at least one of the at least two stations, a correction target value between the received time signal and the common global time base,
a sending arrangement to send the correction target value to other ones of the at least two stations of the distributed bus system, and
a correction value determining arrangement to determine the corresponding correction values in the at least two stations of the distributed bus system, as a function of the correction target value; and
a second arrangement to provide the common global time base that is synchronized with the external reference time at the predefinable instant for the at least two stations of the distributed bus system.

16. The communication system of claim 15, wherein a synchronization of the common global time base with the external reference time is triggerable by comparing the common global time base with the external reference time.

17. A distributed bus system for exchanging data between at least two stations of a communication system, the data being contained in messages sent by the at least two stations, the distributed bus system comprising:
an arrangement operable for use in performing the steps of:
synchronizing a common global time base with an external reference time at a predefinable instant in the at least two stations of the distributed bus system as a function of corresponding correction values and the common global time base, wherein the synchronizing includes:
at least one of the at least two stations: receiving from a source external to the bus system a time signal of the external reference time; based on a content of the time signal, determining a correction target value between the received time signal and the common global time base; and sending the correction target value to other ones of the at least two stations of the distributed bus system; and
the at least two stations of the distributed bus system determining the corresponding correction values as a function of the correction target value; and
providing the common global time base that is synchronized with the external reference time at the predefinable instant for the at least two stations of the distributed bus system.

18. A memory medium for use with a station of at least two stations of a communication system, which is connected to at least one other station of the at least two stations via a distributed bus system to allow exchanging of data, the memory medium comprising:
a storing arrangement to store a computer program for running on a microprocessor of at least one of the at least two stations of a communication system connected to at least another one of the at least two stations via a distributed bus system to allow exchanging of data, the computer program being operable to exchange data between the at least two stations connected to one another via the distributed bus system, the data being contained in messages sent by the at least two stations via the distributed bus system, by performing the steps of:
synchronizing a common global time base with an external reference time at a predefinable instant in the at least two stations of the distributed bus system as a function of corresponding correction values and the common global time base, wherein the step of synchronizing includes:
at least one of the at least two stations: receiving from a source external to the bus system a time signal of the external reference time; based on a content of the time signal, determining a correction target value between the received time signal and the common global time base; and sending the correction target value to other ones of the at least two stations of the distributed bus system; and
the at least two stations of the distributed bus system determining the corresponding correction values as a function of the correction target value; and
providing the common global time base that is synchronized with the external reference time at the predefinable instant for the at least two stations of the distributed bus system.

19. A computer-readable medium having stored thereon a computer program for running on a microprocessor of at least one of the at least two stations of a communication system connected to at least another one of the at least two stations via a distributed bus system to allow exchanging of data, the computer program being operable to perform a method for exchanging data between the at least two stations connected to one another via the distributed bus system, the data being contained in messages sent by the at least two stations via the distributed bus system, the method comprising:

synchronizing a common global time base with an external reference time at a predefinable instant in the at least two stations of the distributed bus system as a function of corresponding correction values and the common global time base, wherein the synchronizing includes:

at least one of the at least two stations: receiving from a source external to the bus system a time signal of the external reference time; based on a content of the time signal, determining a correction target value between the received time signal and the common global time base; and sending the correction target value to other ones of the at least two stations of the distributed bus system; and the at least two stations of the distributed bus system determining the corresponding correction values as a function of the correction target value; and providing the common global time base that is synchronized with the external reference time at the predefinable instant for the at least two stations of the distributed bus system.

20. The computer-readable medium of claim 19, wherein the computer program is stored in a memory element.

21. The computer-readable medium of claim 19, wherein the computer program is stored in a flash memory.

22. The communication system of claim 16, wherein the correction target value is sent to the other ones of the at least two stations periodically.

23. The communication system of claim 16, wherein the correction target value is sent to the other ones of the at least two stations if the correction target value is other than zero.

24. The communication system of claim 16, wherein the correction target value is sent to the other ones of the at least two stations upon a request by one of the other ones of the at least two stations.

25. The communication system of claim 16, wherein the correction target value is contained in a separate message sent to the other ones of the at least two stations of the distributed bus system.

26. The communication system of claim 16, wherein the correction target value is contained in a test message of the distributed bus system that is sent to the other ones of the at least two stations.

27. The communication system of claim 16, wherein the correction target value is contained in test data present in a data message of the distributed bus system that is sent to other ones of the at least two stations.

28. The communication system of claim 16, wherein the corresponding correction values are determined, in the at least two stations of the distributed bus system, using error correction as a function of the correction target value.

29. The communication system of claim 28, wherein the corresponding correction values are determined, in the at least two stations of the distributed bus system, using Byzantine error correction as a function of the correction target value.

30. The communication system of claim 16, wherein the common global time base is synchronized with the external reference time by adding a correction value to the common global time base.

31. The communication system of claim 16, wherein the common global time base is synchronized with the external reference time by multiplying a correction value by the common global time base.

32. The communication system of claim 16, wherein the predefinable instant for synchronizing the common global time base with the external reference time is explicitly predefined.

33. The communication system of claim 32, wherein synchronization of the common global time base with the external reference time is triggered by transmitting the corresponding correction values to a synchronization algorithm at an explicitly predefined instant.

34. The memory medium of claim 18, wherein the memory medium includes one of a read-only memory, a random-access memory and a flash memory.

\* \* \* \* \*